UNITED STATES PATENT OFFICE.

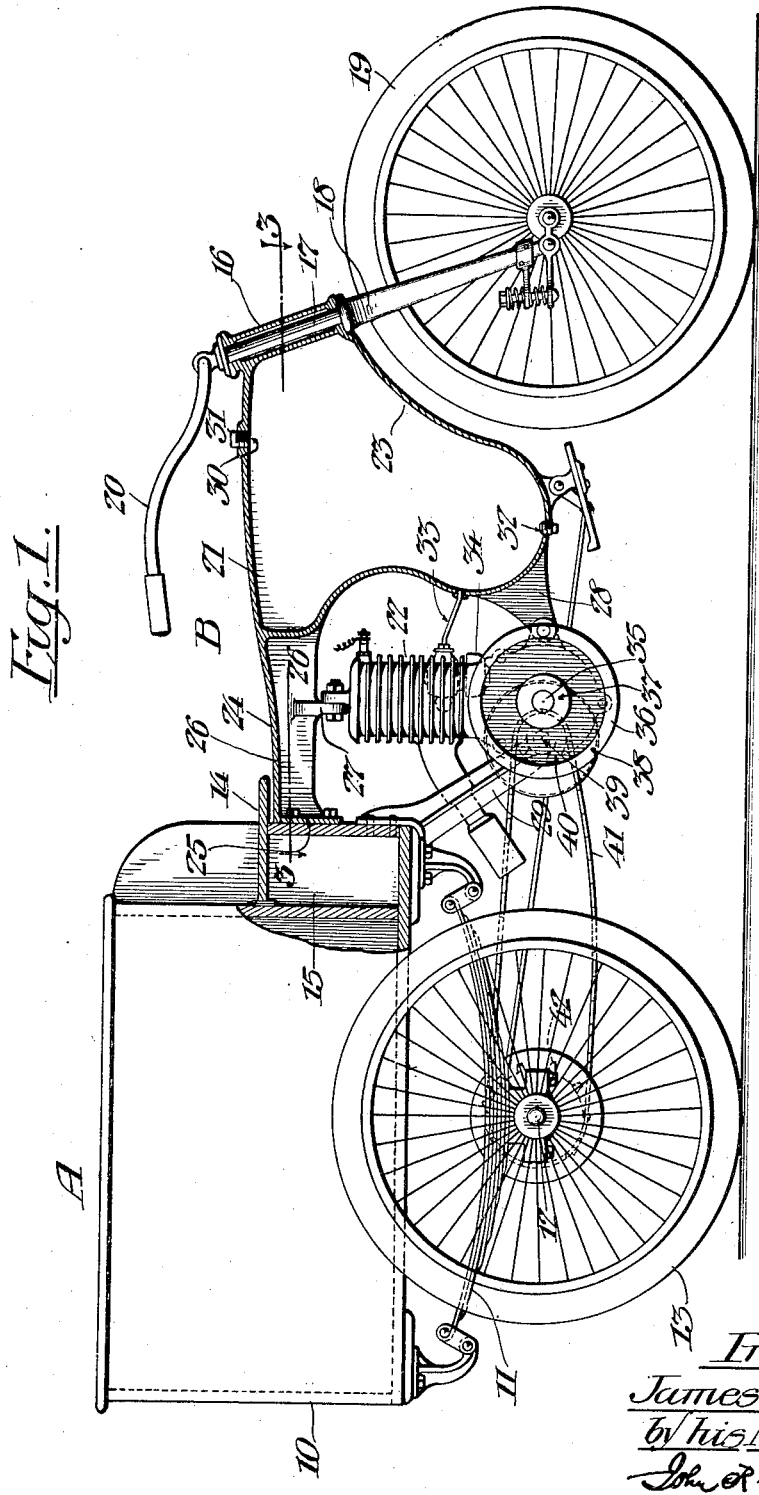

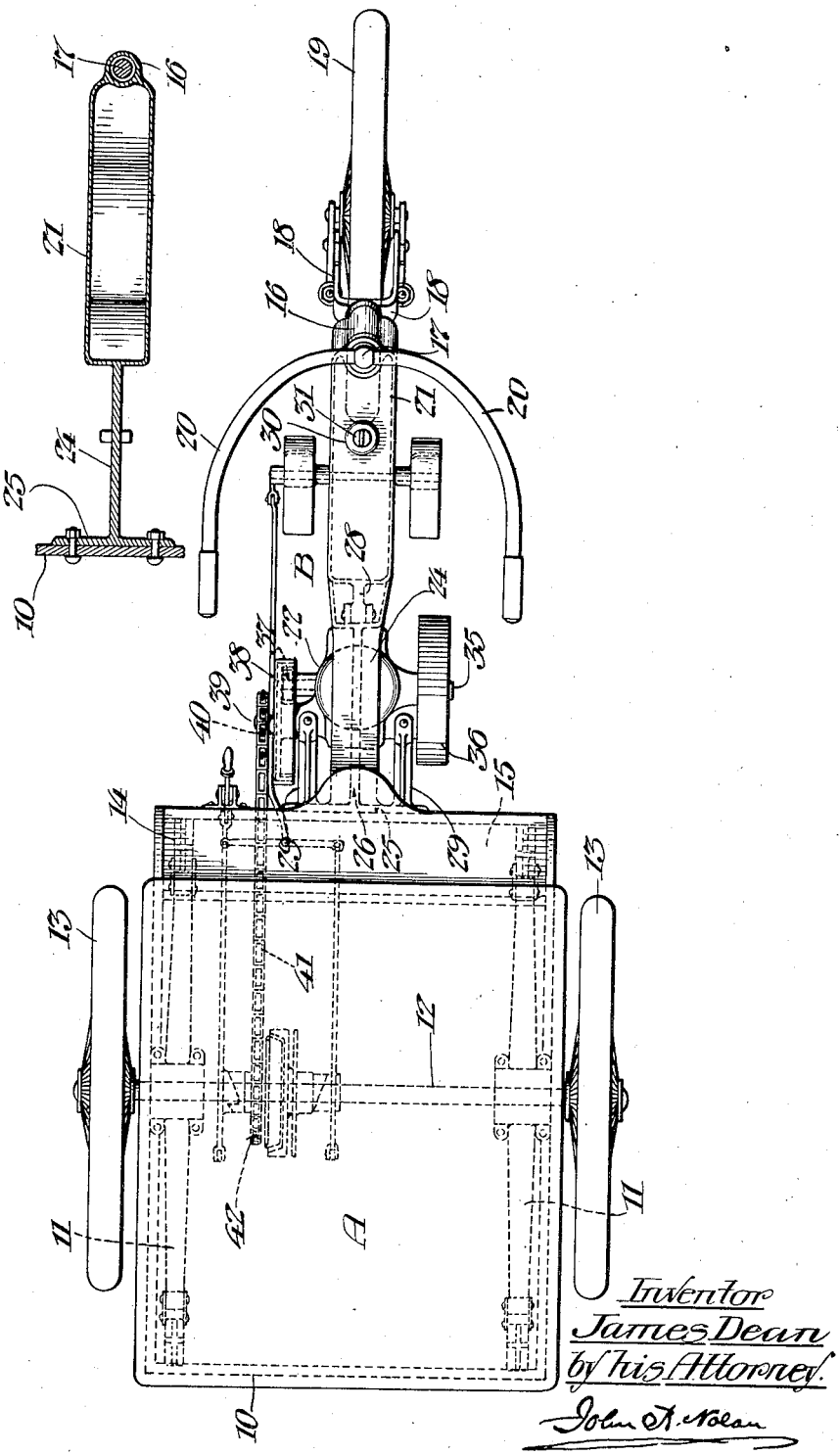

JAMES DEAN, OF NEW YORK, N. Y.

MOTOR-DRIVEN VEHICLE.

1,338,680.  Specification of Letters Patent.  Patented May 4, 1920.

Application filed April 1, 1919. Serial No. 286,677.

*To all whom it may concern:*

Be it known that I, JAMES DEAN, a citizen of the United States, and resident of the city of New York, in the county and State of New York, have invented certain new and useful Improvements in Motor-Driven Vehicles, of which the following is a specification.

This invention relates to motor driven vehicles, having reference more particularly to such vehicles that are adapted for light delivery purposes.

The object of the invention is to provide a motor driven vehicle which shall embody a capacious permanent fuel tank as an integral part of the motor supporting structure, and which vehicle shall be of cheap, simple and compact construction, shall be rigid, durable and relatively light, and shall present a graceful and attractive appearance.

To this end the invention, generally stated, comprises a motor driven vehicle having a permanent fuel tank constituting an essential part of the motor-supporting structure.

The invention also comprises various novel features of construction and combinations of parts which will be hereinafter described and claimed.

In the drawings—

Figure 1 is a longitudinal vertical section, partly in elevation, of a motor driven vehicle embodying a preferred form of my invention.

Fig. 2 is a plan of the improved vehicle.

Fig. 3 is a transverse section through the integral tank and frame element, as on the line 3—3 of Fig. 1.

Referring to the drawings, A designates a wheeled structure comprising, in the present instance, a main body or receptacle 10 of suitable shape and size for its intended purpose, supported at its ends upon appropriate springs 11 which are interposed between the body and the driving axle 12 carrying the running wheels 13. The forward end of the said body or receptacle is provided with a hinged seat 14 which affords a lid or cover for a compartment 15 adapted to contain the battery, tools, &c. Such forward end is also secured to a substantial supporting structure, B, having a suitably-disposed bearing head 16 for the shank 17 of a fork 18 equipped with a steering wheel 19. The shank is provided with handle bars 20, similarly to a motorcycle.

In pursuance of my invention, the structure B, in its preferred form, comprises a relatively-narrow vertically-elongated hollow body 21 having its ends outwardly flared from its lower to its upper portion, to provide a capacious chamber for the reception and storage of gasolene or other fuel for the engine 22. The forward end of this hollow body 21 has formed thereon the inclined bearing head 16 for the shank of the fork 18 and is arranged adjacent to and curved correspondingly with the steering wheel 19, as at 23, to perform the function of a mud-guard. The upper portion of the hollow body 21 is provided with an integral rearward extension 24 having a flanged end 25 and a longitudinal strengthening rib 26. The flanged end 25 is bolted to the forward end of the body 10, and the rib 26 is provided with a depending lug 27 from which the engine 22 is suspended. The lower end of the engine frame or casing is bolted to a short arm 28 formed on and extending rearwardly from the foot of the hollow body 21, which casing is also connected with and braced to the body 10 by a pair of spaced apart bracket arms 29. The top of the hollow body is provided with a suitable inlet 30 (having a plug or cap 31) to enable the chamber to be supplied with gasolene or other fuel, and the lower portion of the chamber is provided with a drain outlet and plug 32. Such lower portion is also equipped with a feed pipe 33 leading to the float chamber of the carbureter 34 of the engine. In the present instance the engine shaft 35 is provided at one end with a fly wheel 36 and at the other end with a gear 37 in mesh with an internal gear wheel 38 fast on a stud shaft 39 having its bearing in the engine casing, which latter shaft carries a sprocket wheel 40 connected by means of a chain 41 with a sprocket wheel 42 on the driving axle 12 of the rearward structure. Any suitable manually operated clutch device may be employed to render the wheel 42 fast or loose on the axle at the will of the operator. When the wheel 42 is clutched to the axle the motion is transmitted to the latter from the engine through the described sprocket gearing.

From the foregoing it will be seen that the fuel storage chamber is an integral part of the forward supporting frame, thus providing a compact structure possessing great strength and rigidity with relatively lightness, and also insuring a capacious permanent fuel tank which presents a graceful and attractive appearance. Moreover the described formation of the combined tank and supporting frame enables the production of the structure at a minimum cost, and also the effective and economic mounting and assembling of the motor and associated parts.

I do not limit myself to the exact form or details of construction herein disclosed as the same may be varied within the spirit of the invention and the scope of the appended claims.

I claim—

1. In a motor driven vehicle, a rearward wheeled structure, a motor, driving connections between the said motor and said structure, and a forward wheeled structure supporting said motor and including a frame comprising a relatively-narrow vertically-elongated hollow body having a horizontally extended upper portion and a reduced lower portion, and a rigid member forming an integral part of the upper portion of said body and connecting the same with the rearward structure, said body constituting a capacious fuel tank and said rigid member providing a support from which the motor is suspended in rear of the tank.

2. In a motor driven vehicle, a rearward wheeled structure, including a driving axle, a forward wheeled structure comprising a hollow depending body constituting a fuel tank and a rigid connecting member extending from the upper portion of said body to the rearward structure, a motor suspended from said member, a connection between the lower portion of the engine frame and the said body, a connection between the lower portion of said frame and the rearward structure, and driving connections between said motor and the rearward structure.

3. In a motor driven vehicle, a rearward wheeled structure, including a driving axle, a forward supporting structure comprising a hollow depending body constituting a fuel tank, a forward bearing portion on said body, and a rigid connecting member between said body and the rearward structure, a steering wheel, a fork, including a shank and handle bars, said fork being mounted in said bearing portion, a motor mounted upon said forward structure in the space between said body and the rearward structure, and drive connections between said motor and the said driving axle.

4. In a motor driven vehicle, a rearward wheeled structure, including a driving axle, a forward supporting structure, including a steering wheel, said latter structure comprising a hollow depending body constituting a fuel tank, the forward portion of said body being arranged adjacent to and curved correspondingly to the steering wheel, a rigid connecting member between said body and the rearward structure, a motor mounted upon said forward structure in the space between said body and the rearward structure, and drive connections between said motor and said driving axle.

5. A motor driven vehicle having a supporting structure comprising a relatively-narrow vertically-elongated hollow body having a horizontally extended upper portion and a reduced lower portion, and having also a rigid member extending from and forming an integral part of the upper portion of said body, said body constituting a fuel tank and said member constituting a motor support.

Signed at New York, in the county and State of New York, this 26th day of March, A. D. 1919.

JAMES DEAN.